(12) United States Patent
Inoshita et al.

(10) Patent No.: US 10,851,732 B2
(45) Date of Patent: Dec. 1, 2020

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi (JP)

(72) Inventors: Kenji Inoshita, Okazaki (JP); Norihisa Nakagawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/732,419

(22) Filed: Jan. 2, 2020

(65) Prior Publication Data
US 2020/0217264 A1 Jul. 9, 2020

(30) Foreign Application Priority Data
Jan. 9, 2019 (JP) .................................. 2019-001820

(51) Int. Cl.
 *B60T 7/12* (2006.01)
 *F02D 41/30* (2006.01)
(52) U.S. Cl.
 CPC ...... *F02D 41/30* (2013.01); *F02D 2200/0814* (2013.01)
(58) Field of Classification Search
 CPC ... B60W 2510/0619; B60W 2710/0622; F02B 19/1052; F02B 19/1085; F02D 35/0046;
 (Continued)

(56) References Cited

U.S. PATENT DOCUMENTS

2008/0148711 A1* 6/2008 Takubo ............... F02D 41/0295
60/285
2008/0154476 A1* 6/2008 Takubo ............... F02D 41/0295
701/101
(Continued)

FOREIGN PATENT DOCUMENTS

| DE | 10 2013 201 7 | 8/2014 |
| JP | 2015-71963 A | 4/2015 |
| JP | 5949957 B2 | 7/2016 |

OTHER PUBLICATIONS

Extended European Search Report dated May 18, 2020, in Patent Application No. 20150418.0 cited document AO, 11 pages.

*Primary Examiner* — John Kwon
(74) *Attorney, Agent, or Firm* — Oblon, McClelland, Maier & Neustadt, L.L.P.

(57) ABSTRACT

The controller includes a fuel amount control unit adjusting amount of fuel supplied to a cylinder through feedback control with an air-fuel ratio deviation as input, a target air-fuel ratio adjustment unit alternately repeating a lean period process and a rich period process, and a learning value correction unit updating a learning value to compensate for a steady deviation in an air-fuel ratio. If an absolute value of an oxygen amount deviation is less than a determination value, the learning value update unit updates a learning value only when one of the lean period process and the rich period process is switched to the other one. If the absolute value of the oxygen amount deviation is greater than or equal to the determination value, the learning value is updated both when one of the processes is switched to the other one and when the switching is reversed.

8 Claims, 7 Drawing Sheets

(58) Field of Classification Search
CPC ......... F02D 2700/0225; F02D 35/0015; F02D 41/0052; F02D 41/0055
USPC ................ 701/103, 104, 108, 109, 114, 115; 60/274, 285
See application file for complete search history.

(56) References Cited

U.S. PATENT DOCUMENTS

| | | | |
|---|---|---|---|
| 2009/0173323 A1* | 7/2009 | Ishii | F02D 41/1482 123/685 |
| 2016/0017831 A1 | 1/2016 | Nakagawa et al. | |
| 2016/0245145 A1 | 8/2016 | Okazaki et al. | |
| 2016/0265465 A1* | 9/2016 | Yamaguchi | F02D 41/2461 |

* cited by examiner

CONTROLLER FOR INTERNAL COMBUSTION ENGINE AND METHOD FOR CONTROLLING INTERNAL COMBUSTION ENGINE

BACKGROUND

1. Field

The following description relates to a controller for an internal combustion engine and a method for controlling an internal combustion engine.

2. Description of Related Art

Japanese Laid-Open Patent Publication No. 2015-71963 describes one example of a controller for an internal combustion engine that adjusts a fuel injection amount of a fuel injection valve so that an air-fuel ratio detection value becomes equal to a target air-fuel ratio. The air-fuel ratio detection value is a sensor value detected by an upstream side air-fuel ratio sensor located at the upstream side of a catalyst in an exhaust passage. There may be a steady deviation between the air-fuel ratio detection value and an actual air-fuel ratio. The actual air-fuel ratio is the real air-fuel ratio. Accordingly, the controller described in Japanese Laid-Open Patent Publication No. 2015-71963 executes a compensation control that compensates for the steady deviation between the air-fuel ratio detection value and the actual air-fuel ratio and a learning control that updates a learning value used for compensation of the steady deviation.

In the learning control, a lean period process and a rich period process are alternately repeated. During the lean period process, the target air-fuel ratio is set to a leaner value than the stoichiometric air-fuel ratio. Further, an oxygen adsorption amount, which is the amount of oxygen adsorbed in the catalyst during a lean period, is acquired. During the rich period process, the target air-fuel ratio is set to a richer value than the stoichiometric air-fuel ratio. Further, an oxygen desorption amount, which is the amount of oxygen desorbed from the catalyst during a rich period, is acquired. During the lean period process, when an exhaust air-fuel ratio becomes leaner value than the stoichiometric air-fuel ratio, the process performed by the controller is switched from the lean period process to the rich period process. Further, during the rich period process, when the exhaust air-fuel ratio becomes a richer value than the stoichiometric air-fuel ratio, the process performed by the controller switches from the rich period process to the lean period process. In this case, the exhaust air-fuel ratio is a sensor value detected by a downstream side air-fuel ratio sensor located at the downstream side of the catalyst in the exhaust passage.

When the steady deviation is relatively large, the oxygen adsorption amount of the catalyst may be overly large or overly small. Thus, a relatively large steady deviation increases an absolute value of an oxygen amount deviation that is a deviation between the oxygen desorption amount acquired during the rich period process and the oxygen adsorption amount acquired during the lean period process. In the learning control described in Japanese Laid-Open Patent Publication No. 2015-71963, when one of the lean period process and the rich period process is switched to the other one of the lean period process and the rich period process, the learning value is updated based on the absolute value of the oxygen amount deviation. However, when the switching of processes is reversed, the learning value is not updated. The learning value is a value used to correct the fuel injection amount or the target air-fuel ratio.

In the compensation control, the fuel injection amount or the target air-fuel ratio is corrected based on the learning value updated in the learning control. When the oxygen amount deviation is included in a permissible range as a result of the compensation control, the learning control ends; that is, update of the learning value is completed. Even after the learning control ends, the compensation control is continued, that is, the above-described correction using the learning value is continued.

In the above-described learning control, the learning value is updated when a set of the lean period process and the rich period process is performed once. Thus, if the lean period process or the rich period process is performed for a long period of time, the learning value will be updated at long intervals. Therefore, if the learning control is started under a condition in which the steady deviation is relatively large, a relatively long amount of time will be required to complete the learning value update.

SUMMARY

One object of the present disclosure is to provide a controller for an internal combustion engine that reduces the amount of time required to complete updating a learning value.

To solve the above problem, a controller for an internal combustion engine is provided in accordance with a first mode of the present invention. The internal combustion engine includes an exhaust passage, into which an exhaust produced in the internal combustion engine is discharged, and an exhaust purification device. The exhaust purification device includes a catalyst arranged in the exhaust passage and having an oxygen adsorption function. The exhaust purification device uses oxygen absorbed in the catalyst to purify the exhaust flowing through the exhaust passage. The controller includes a fuel amount control unit, a target air-fuel ratio adjustment unit, and a learning value update unit. The fuel amount control unit is configured to adjust an amount of fuel supplied to a cylinder of the internal combustion engine through feedback control that uses an air-fuel ratio deviation, which is a deviation between an air-fuel ratio detection value and a target air-fuel ratio, as an input. The air-fuel ratio detection value is an air-fuel ratio detected by an upstream side air-fuel ratio sensor located at an upstream side of the catalyst in the exhaust passage. The target air-fuel ratio adjustment unit is configured to alternately repeat a lean period process and a rich period process. During lean period process, the target air-fuel ratio is set to a leaner value than a stoichiometric air-fuel ratio. During the rich period process, the target air-fuel ratio is set to a richer value than the stoichiometric air-fuel ratio. The learning value update unit is configured to update a learning value that compensates for a steady deviation in the air-fuel ratio detection value. The controller is configured to use the learning value to correct a deviation between an oxygen adsorption amount and an oxygen desorption amount. The oxygen adsorption amount is an amount of oxygen adsorbed in the catalyst during the lean period process. The oxygen desorption amount is an amount of oxygen desorbed from the catalyst during the rich period process. In a case where an absolute value of an oxygen amount deviation between the oxygen adsorption amount and the oxygen desorption amount is less than a determination value, the learning value update unit is configured to update the learning value when one of the lean period process and the rich period process is switched to the other one of the lean period process and the rich period process. The learning value update unit is configured to update the learning value when the other one of the lean period process and the rich period process is switched to the one of the lean period process and the rich period process. Further, in a case where the absolute value of the oxygen amount deviation is greater than or equal to the determination value, the learning value update unit is configured to update the learning value in both of a case where one of the lean period process and the rich period process is switched to the other one of the lean period process and the rich period process and a case where the other one of the lean period process and the rich period process is switched to the one of the lean period process and the rich period process.

To solve the above problem, a controller for an internal combustion engine is provided in accordance with a second mode of the present invention. The internal combustion engine includes an exhaust passage, into which an exhaust produced in the internal combustion engine is discharged, and an exhaust purification device. The exhaust purification device includes a catalyst arranged in the exhaust passage and having an oxygen adsorption function. The exhaust purification device uses oxygen absorbed in the catalyst to purify the exhaust flowing through the exhaust passage. The controller includes circuitry configured to adjust an amount of fuel supplied to a cylinder of the internal combustion engine through feedback control that uses an air-fuel ratio deviation, which is a deviation between an air-fuel ratio detection value and a target air-fuel ratio, as input. The air-fuel ratio detection value is an air-fuel ratio detected by an upstream side air-fuel ratio sensor located at an upstream side of the catalyst in the exhaust passage. The circuitry is further configured to alternately repeat a lean period process and a rich period process. During lean period process, the target air-fuel ratio is set to a leaner value than a stoichiometric air-fuel ratio. During the rich period process, the target air-fuel ratio is set to a richer value than the stoichiometric air-fuel ratio. The circuitry is further configured to update a learning value that compensates for a steady deviation in the air-fuel ratio detection value. The circuitry is further configured to use the learning value to correct a deviation between an oxygen adsorption amount and an oxygen desorption amount. The oxygen adsorption amount is an amount of oxygen adsorbed in the catalyst during the lean period process. The oxygen desorption amount is an amount of oxygen desorbed from the catalyst during the rich period process. In a case where an absolute value of an oxygen amount deviation between the oxygen adsorption amount and the oxygen desorption amount is less than a determination value, the circuitry is configured to update the learning value when one of the lean period process and the rich period process is switched to the other one of the lean period process and the rich period process. The learning value update unit is configured to update the learning value when the other one of the lean period process and the rich period process is switched to the one of the lean period process and the rich period process. Further, in a case where the absolute value of the oxygen amount deviation is greater than or equal to the determination value, the circuitry is configured to update the learning value in both of a case where one of the lean period process and the rich period process is switched to the other one of the lean period process and the rich period process and a case where the other one of the lean period process and the rich period process is switched to the one of the lean period process and the rich period process.

To solve the above problem, a method for controlling an internal combustion engine is provided in accordance with a third mode of the present invention. The internal combustion engine includes an exhaust passage, into which an exhaust produced in the internal combustion engine is discharged, and an exhaust purification device. The exhaust purification device includes a catalyst arranged in the exhaust passage and having an oxygen adsorption function. The exhaust purification device uses oxygen absorbed in the catalyst to purify the exhaust flowing through the exhaust passage. The control method includes adjusting an amount of fuel supplied to a cylinder of the internal combustion engine through feedback control that uses an air-fuel ratio deviation, which is a deviation between an air-fuel ratio detection value and a target air-fuel ratio, as input. The air-fuel ratio detection value is an air-fuel ratio detected by an upstream side air-fuel ratio sensor located at an upstream side of the catalyst in the exhaust passage. The control method further includes alternately repeating a lean period process and a rich period process. During the lean period process, the target air-fuel ratio is a leaner value than a stoichiometric air-fuel ratio. During the rich period process, the target air-fuel ratio is a richer value than the stoichiometric air-fuel ratio. The control method further includes updating a learning value that compensates for a steady deviation in the air-fuel ratio detection value. The control method further includes correcting a deviation between an oxygen adsorption amount and an oxygen desorption amount using the learning value. The oxygen adsorption amount is an amount of oxygen adsorbed in the catalyst during the lean period process. The oxygen desorption amount is an amount of oxygen desorbed from the catalyst during the rich period process. In a case where an absolute value of an oxygen amount deviation between the oxygen adsorption amount and the oxygen desorption amount is less than a determination value, the control method includes updating the learning value when one of the lean period process and the rich period process is switched to the other one of the lean period process and the rich period process and not updating the learning value when the other one of the lean period process and the rich period process is switched to the one of the lean period process and the rich period process. In a case where the absolute value of the oxygen amount deviation is greater than or equal to the determination value, the control method includes updating the learning value in both of a case where one of the lean period process and the rich period process is switched to the other one of the lean period process and the rich period process and a case where the other one of the lean period process and the rich period process is switched to the one of the lean period process and the rich period process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a controller for an internal combustion engine will now be described with reference to FIGS. 1 to 8.

Figure 1:
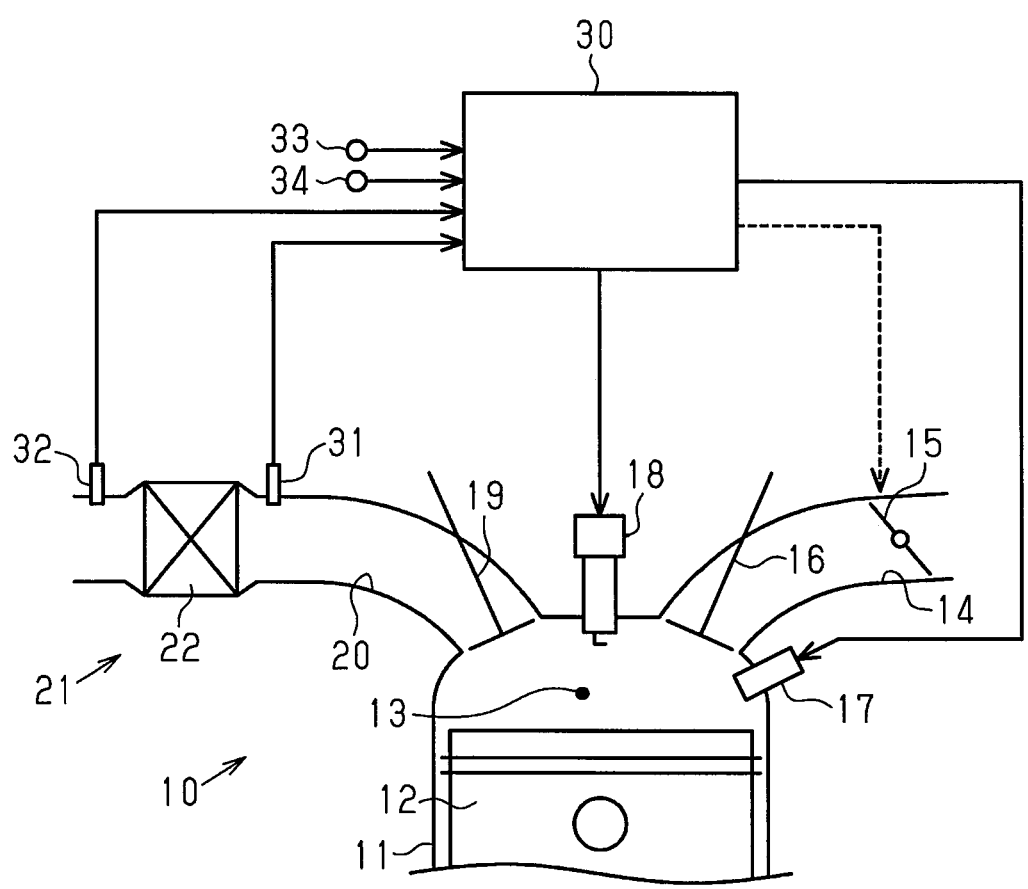
FIG. 1 is a diagram showing the configuration of a controller for an internal combustion engine in accordance with one embodiment and an internal combustion engine controlled by the controller.

FIG. 1 shows a controller 30 of the present embodiment and an internal combustion engine 10 controlled by the controller 30. The internal combustion engine 10 includes a plurality of cylinders 11. FIG. 1 only shows one cylinder 11. A piston 12 reciprocates in each cylinder 11. In each cylinder 11, the space above the piston 12 defines a combustion chamber 13.

The internal combustion engine 10 includes an intake passage 14 where a throttle valve 15 is arranged to adjust the amount of intake air flowing through the intake passage 14. When an intake valve 16 is open, intake air is drawn through the intake passage 14 into the combustion chamber 13.

The internal combustion engine 10 includes a fuel injection valve 17 that injects fuel. The fuel injection valve 17 shown in FIG. 1 is a direct injection valve that directly injects fuel into the combustion chamber 13. Further, the internal combustion engine 10 includes an ignition device 18 that produces a spark discharge to ignite the mixture of intake air and fuel. The number of the fuel injection valves 17 and the ignition devices 18 is the same as the number of the cylinders. The exhaust resulting from the combustion of the air-fuel mixture in the combustion chamber 13 is discharged into an exhaust passage 20 when an exhaust valve 19 opens.

The internal combustion engine 10 includes an exhaust purification device 21 that has a catalyst 22 arranged in the exhaust passage 20. The catalyst 22 has an oxygen adsorption function. The exhaust purification device 21 is configured to oxidize (burn) unburned fuel flowing into the exhaust purification device 21 with the oxygen adsorbed in the catalyst 22. Specifically, the exhaust purification device 21 uses the oxygen adsorbed in the catalyst 22 to purify the exhaust flowing through the exhaust passage 20.

Further, an upstream side air-fuel ratio sensor 31 is arranged at an upstream side of the catalyst 22 in the exhaust passage 20 (that is, at the side of the combustion chamber 13). Moreover, a downstream side air-fuel ratio sensor 32 is arranged at a downstream side of the catalyst 22 in the exhaust passage 20. The air-fuel ratio sensors 31 and 32 are known air-fuel ratio sensors. The upstream side air-fuel ratio sensor 31 is configured to detect the air-fuel ratio of the air-fuel mixture and outputs a signal having an intensity that is proportional to an oxygen concentration rate of the exhaust flowing toward the catalyst 22. Further, the downstream side air-fuel ratio sensor 32 outputs a signal having an intensity that is proportional to the oxygen concentration rate of the exhaust that passed through the catalyst 22. In the present embodiment, "air-fuel ratio detection value AF" will refer to a value corresponding to the intensity of the signal output from the upstream side air-fuel ratio sensor 31, and "exhaust air-fuel ratio AFEX" will refer to a value corresponding to the intensity of the signal output from the downstream side air-fuel ratio sensor 32.

Signals from various types of sensors including the upstream side air-fuel ratio sensor 31 and the downstream side air-fuel ratio sensor 32 are input to the controller 30. Examples of sensors besides the air-fuel ratio sensors 31 and 32 include a crank angle sensor 33, an air flowmeter 34, and the like. The crank angle sensor 33 outputs a signal corresponding to an engine rotation speed NE, which is a rotation speed of a crankshaft of the internal combustion engine 10. The air flowmeter 34 outputs a signal corresponding to an intake air amount GA of the intake air flowing into the intake passage 14. The controller 30 controls the fuel injection valve 17 and the ignition device 18 based on signals from the various types of sensors 31 to 34.

There may be a steady deviation between the air-fuel ratio detection value AF, which is detected by the upstream side air-fuel ratio sensor 31, and an actual air-fuel ratio AFR, which is the actual air-fuel ratio of the air-fuel mixture. The controller 30 executes a learning control and a compensation control. In the learning control, a learning value X used for compensation of the steady deviation is updated. In the compensation control, the steady deviation is compensated using the learning value X acquired in the learning control.

Figure 2:
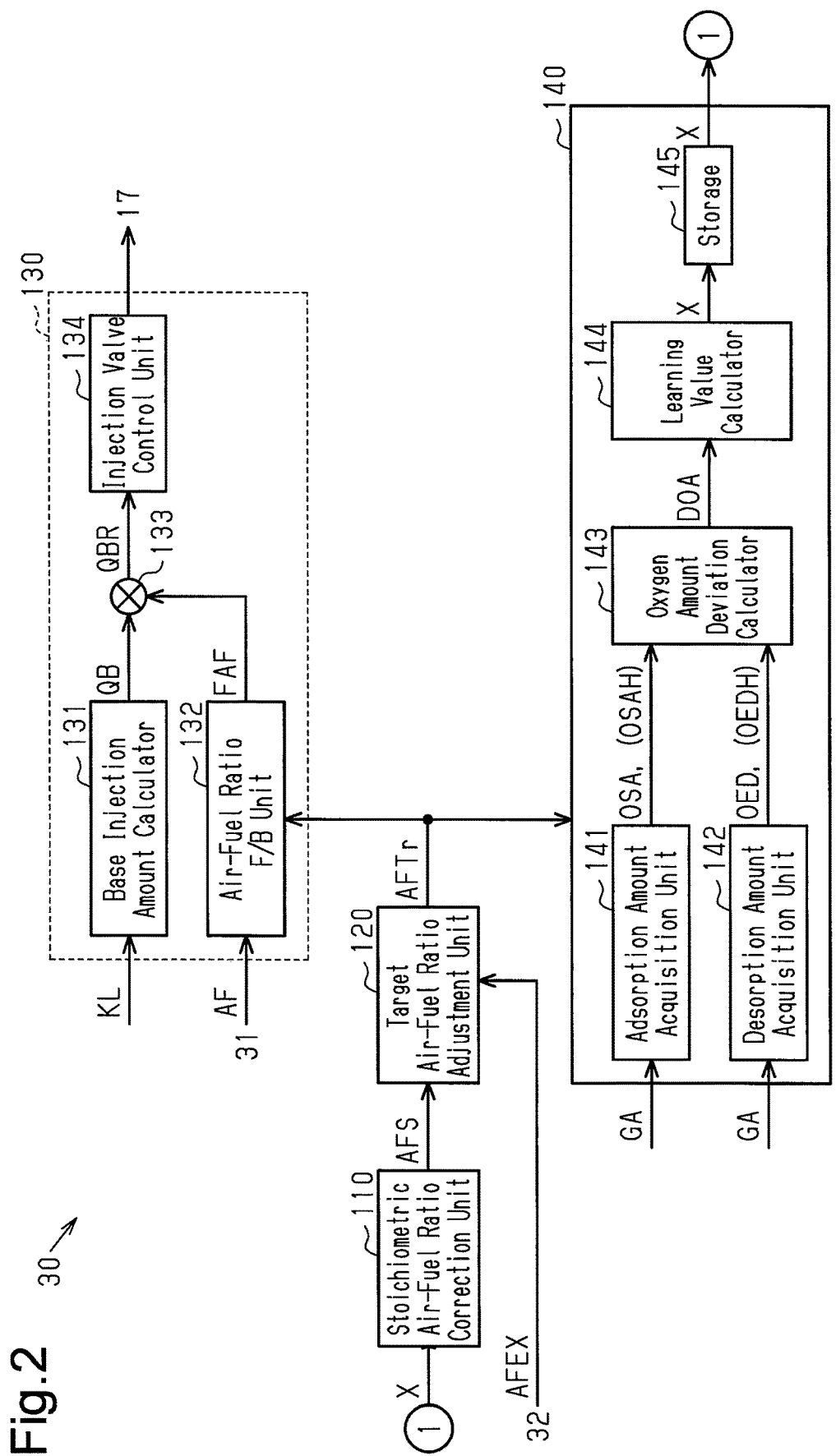
FIG. 2 is a block diagram showing the functional configuration of the controller.

The functional configuration of the controller 30 will now be described with reference to FIG. 2.

The controller 30 includes functional units necessary for executing the learning control and the compensation control, namely, a stoichiometric air-fuel ratio correction unit 110, a target air-fuel ratio adjustment unit 120, a fuel amount control unit 130, and a learning value update unit 140.

When the compensation control is executed, the stoichiometric air-fuel ratio correction unit 110 uses the air-fuel ratio detection value AF detected by the upstream side air-fuel ratio sensor 31 to correct a stoichiometric air-fuel ratio AFS as a value necessary for executing an air-fuel ratio control. Specifically, the stoichiometric air-fuel ratio correction unit 110 corrects a base stoichiometric air-fuel ratio AFSB using the learning value X updated by the learning value update unit 140, which will be described later, and acquires the stoichiometric air-fuel ratio AFS. The stoichiometric air-fuel ratio correction unit 110 calculates the stoichiometric air-fuel ratio AFS from the following equation (Equation 1). Specifically, when the learning value X is a positive value, the stoichiometric air-fuel ratio AFS is smaller than the base stoichiometric air-fuel ratio AFSB. Further, when the learning value X is a negative value, the stoichiometric air-fuel ratio AFS is larger than the base stoichiometric air-fuel ratio AFSB. Further, the difference of the stoichiometric air-fuel ratio AFS and the base stoichiometric air-fuel ratio AFSB is increased as the absolute value of the learning value X increases. The base stoichiometric air-fuel ratio AFSB is, for example, "14.6".

Equation 1

$$AFS = (1-X)*AFSB \qquad \text{(Equation 1)}$$

The target air-fuel ratio adjustment unit 120 determines a target air-fuel ratio AFTr based on the stoichiometric air-fuel ratio AFS acquired by the stoichiometric air-fuel ratio correction unit 110. Thus, when the learning control is not executed, the target air-fuel ratio adjustment unit 120 sets the target air-fuel ratio AFTr to the same value as the stoichiometric air-fuel ratio AFS.

When the learning control is executed, the target air-fuel ratio adjustment unit 120 alternately repeats a lean period process and a rich period process. During the lean period process, the target air-fuel ratio AFTr is set to a leaner value than the stoichiometric air-fuel ratio AFS. During the rich period process, the target air-fuel ratio AFTr is set to a richer value than the stoichiometric air-fuel ratio AFS. Specific control contents of the lean period process, specific control contents of the rich period process, switching of the lean period process to the rich period process, and switching of the rich period process to the lean period process will be described later.

The fuel amount control unit 130 controls a fuel injection amount of the fuel injection valve 17 based on the target air-fuel ratio AFTr determined by the target air-fuel ratio adjustment unit 120 and the air-fuel ratio detection value AF detected by the upstream side air-fuel ratio sensor 31. Specifically, the fuel amount control unit 130 includes a base injection amount calculator 131, an air-fuel ratio feedback unit 132, a multiplier 133, and an injection valve control unit 134. In the description hereafter, the air-fuel ratio feedback unit 132 will simply be referred to "air-fuel ratio FB unit 132".

The base injection amount calculator 131 calculates a base injection amount QB based on an engine load factor KL. The base injection amount QB is calculated as the product of a specified fully-filled theoretic injection amount QTH and the engine load factor KL. The fully-filled theoretic injection amount QTH is set to a calculated value of the fuel injection amount when the engine load factor KL is "100%" and the air-fuel ratio detection value AF is equal to the target air-fuel ratio AFTr. Further, the engine load factor KL can be calculated, for example, based on the engine rotation speed NE and the intake air amount GA.

The air-fuel ratio F/B unit 132 executes feedback control to calculate the sum of a proportional element, an integral element, and a differential element as a correction ratio δ. The feedback control uses an air-fuel ratio deviation ΔAF, which is the deviation between the air-fuel ratio detection value AF and the target air-fuel ratio AFTr, as input. Then, the air-fuel ratio F/B unit 132 calculates the sum of the calculated correction ratio δ and "1" as a feedback correction amount FAF.

The multiplier 133 calculates the product of the base injection amount QB, which is calculated by the base injection amount calculator 131, and the feedback correction amount FAF, which is calculated by the air-fuel ratio F/B unit 132, as a required injection amount QBR.

The injection valve control unit 134 operates the fuel injection valve 17 based on the required injection amount QBR calculated by the multiplier 133. In this case, the injection valve control unit 134 lengthens an energizing time of an electromagnetic coil of the fuel injection valve 17 as the required injection amount QBR increases.

The learning value update unit 140 updates the learning value X when the learning control is executed. Specifically, the learning value update unit 140 includes an adsorption amount acquisition unit 141, a desorption amount acquisition unit 142, an oxygen amount deviation calculator 143, a learning value calculator 144, and storage 145.

When the lean period process is performed by the target air-fuel ratio adjustment unit 120, the adsorption amount acquisition unit 141 calculates an oxygen adsorption amount OSA, which is the amount of oxygen adsorbed in the catalyst 22 during the lean period process. The calculation process of the oxygen adsorption amount OSA will be described later.

When the rich period process is performed by the target air-fuel ratio adjustment unit 120, the desorption amount acquisition unit 142 calculates an oxygen desorption amount OED, which is the amount of oxygen desorbed from the catalyst 22 during the rich period process. The calculation process of the oxygen desorption amount OED will be described later.

The oxygen amount deviation calculator 143 calculates an oxygen amount deviation DOA, which is the deviation between the oxygen adsorption amount OSA calculated by the adsorption amount acquisition unit 141 and the oxygen desorption amount OED calculated by the desorption amount acquisition unit 142. That is, the oxygen amount deviation calculator 143 calculates the value obtained by subtracting the oxygen adsorption amount OSA from the oxygen desorption amount OED as the oxygen amount deviation DOA. In the present embodiment, the oxygen amount deviation calculator 143 calculates the oxygen amount deviation DOA in both cases where the process performed by the target air-fuel ratio adjustment unit 120 is switched from the lean period process to the rich period process and where the process performed by the target air-fuel ratio adjustment unit 120 is switched from the rich period process to the lean period process. The calculation process of the oxygen amount deviation DOA will be described later.

The learning value calculator 144 updates the learning value X based on the oxygen amount deviation DOA calculated by the oxygen amount deviation calculator 143. The updating process of the learning value X will be described later. Then, the learning value calculator 144 updates the learning value X and stores the updated learning value X in the storage 145. That is, the storage 145 stores the most recent value of the learning value X updated by the learning value update unit 140. The most recent value of the learning value X stored in the storage 145 is used by the stoichiometric air-fuel ratio correction unit 110 to correct the stoichiometric air-fuel ratio AFS.

Figure 3:
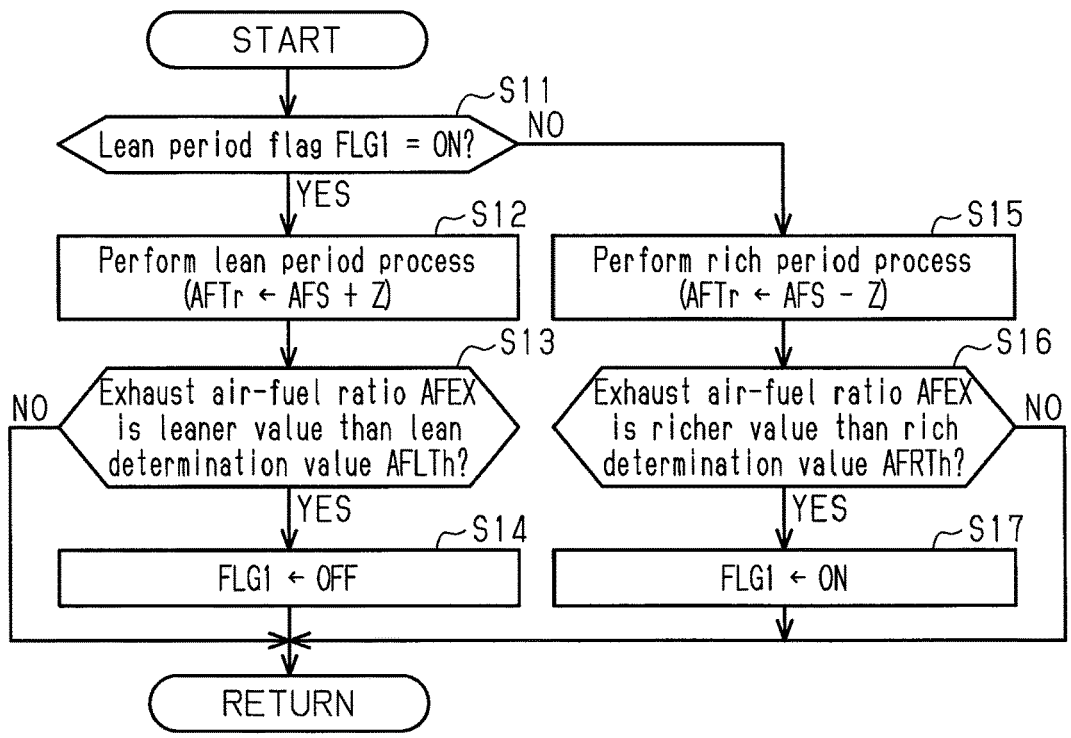
FIG. 3 is a flowchart illustrating a processing routine performed by a target air-fuel ratio adjustment unit of the controller.

A processing routine performed by the target air-fuel ratio adjustment unit 120 in the learning control will now be described with reference to FIG. 3. This processing routine is repeatedly performed during execution of the learning control.

In step S11 of the present processing routine, the target air-fuel ratio adjustment unit 120 determines whether a lean period flag FLG1 is set ON. The lean period flag FLG1 is a flag for determining whether to permit execution of the lean period process or the rich period process. Specifically, when the lean period flag FLG1 is set ON, execution of the lean period process is permitted. Further, when the lean period flag FLG1 is set OFF, execution of the rich period process is permitted. When initiating the learning control, the lean period flag FLG1 is set ON.

In step S11, when the lean period flag FLG1 is set ON (YES), the target air-fuel ratio adjustment unit 120 proceeds to step S12. In step S12, the target air-fuel ratio adjustment unit 120 executes the lean period process. Specifically, during the lean period process, the target air-fuel ratio AFTr is calculated by adding a specified changed value Z to the stoichiometric air-fuel ratio AFS. Thus, the target air-fuel ratio AFTr is a leaner value than the stoichiometric air-fuel ratio AFS. Subsequently, in step S13, the target air-fuel ratio adjustment unit 120 determines whether the exhaust air-fuel ratio AFEX is a leaner value than a lean determination value AFLTh. The lean determination value AFLTh is set to a leaner value than the base stoichiometric air-fuel ratio AFSB. Thus, when the exhaust air-fuel ratio AFEX is a leaner value than the lean determination value AFLTh, the catalyst 22 is unable to absorb more oxygen.

In step S13, when the exhaust air-fuel ratio AFEX is not a leaner value than the lean determination value AFLTh (NO), the target air-fuel ratio adjustment unit 120 temporarily ends the present processing routine. In this case, the target air-fuel ratio adjustment unit 120 continues the lean period process. When the exhaust air-fuel ratio AFEX is a leaner value than the lean determination value AFLTh (S13: YES), the target air-fuel ratio adjustment unit 120 proceeds to step S14. In step S14, the lean period flag FLG1 is set OFF. Then, the target air-fuel ratio adjustment unit 120 temporarily ends the present processing routine.

When the lean period flag FLG1 is set OFF (NO) in step S11, the target air-fuel ratio adjustment unit 120 proceeds to step S15. In step S15, the rich period process is performed. That is, when the lean period flag FLG1 is switched from ON to OFF, the lean period process is switched to the rich period process. During the rich period process, the target air-fuel ratio adjustment unit 120 calculates the target air-fuel ratio AFTr by subtracting the changed value Z from the stoichiometric air-fuel ratio AFS. Thus, the target air-fuel ratio AFTr is a richer value than the stoichiometric air-fuel ratio AFS. Subsequently, in step S16, the target air-fuel ratio adjustment unit 120 determines whether the exhaust air-fuel ratio AFEX is a richer value than a rich determination value AFRTh. The rich determination value AFRTh is set to a richer value than the base stoichiometric air-fuel ratio AFSB. Thus, when the exhaust air-fuel ratio AFEX is a richer value than the rich determination value AFRTh, the catalyst 22 already has no adsorbed oxygen. Accordingly, the exhaust purification device 21 is unable to oxidize (burn) unburned fuel. As a result, unburned fuel flows downstream from the catalyst 22 in the exhaust passage 20.

In step S16, when the exhaust air-fuel ratio AFEX is not a richer value than the rich determination value AFRTh (NO), the target air-fuel ratio adjustment unit 120 temporarily ends the present processing routine. In this case, oxygen still remains adsorbed in the catalyst 22 in the catalyst 22 until the rich period process is started. Thus, the rich period process is continued. When the exhaust air-fuel ratio AFEX is a richer value than the rich determination value AFRTh (S16: YES), the target air-fuel ratio adjustment unit 120 proceeds to step S17. In step S17, the lean period flag FLG1 is set ON. Then, the target air-fuel ratio adjustment unit 120 temporarily ends the present processing routine. When the lean period flag FLG1 is switched from OFF to ON in this manner, the rich period process is switched to the lean period process.

Figure 4:
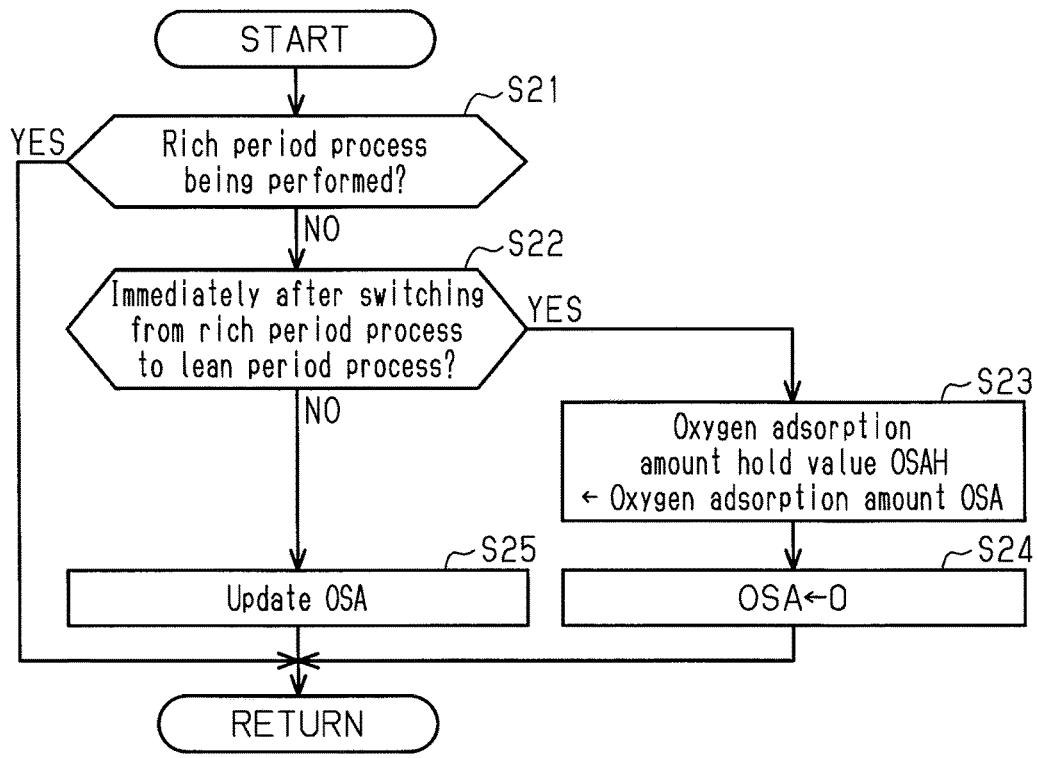
FIG. 4 is a flowchart illustrating a processing routine performed by an adsorption amount acquisition unit of the controller.

A processing routine performed by the adsorption amount acquisition unit 141 when calculating the oxygen adsorption amount OSA will now be described with reference to FIG. 4. This processing routine is repeatedly performed during execution of the learning control.

In step S21 of the present processing routine, the adsorption amount acquisition unit 141 determines whether the target air-fuel ratio adjustment unit 120 is performing the rich period process. When the adsorption amount acquisition unit 141 determines that the rich period process is being performed (S21: YES), the amount of oxygen adsorbed in the catalyst 22 will not increase. Thus, the adsorption amount acquisition unit 141 temporarily ends the present processing routine. When determining that the rich period process is not being performed (S21: NO), the adsorption amount acquisition unit 141 proceeds to step S22. In step S22, the adsorption amount acquisition unit 141 determines whether the process performed by the target air-fuel ratio adjustment unit 120 is a process performed immediately after switching from the rich period process to the lean period process. When the rich period process was performed in the preceding processing routine and the lean period process is being performed in the present processing routine, the process performed by the target air-fuel ratio adjustment unit 120 is a process performed immediately after switching from the rich period process to the lean period process. When the lean period process was performed in the preceding processing routine and the lean period process is also being performed in the present processing routine, the process performed by the target air-fuel ratio adjustment unit 120 is a process that is not immediately after switching from the rich period process to the lean period process.

When the adsorption amount acquisition unit 141 determines that the rich period process has just been switched to the lean period process (S22: YES), the adsorption amount acquisition unit 141 proceeds to step S23. In step S23, the oxygen adsorption amount OSA is substituted into an oxygen adsorption amount hold value OSAH. Specifically, the oxygen adsorption amount hold value OSAH becomes the same value as the oxygen adsorption amount OSA acquired during the preceding lean period process. Subsequently, in step S24, the oxygen adsorption amount OSA is reset to "0". Then, the adsorption amount acquisition unit 141 temporarily ends the present processing routine. When the adsorption amount acquisition unit 141 determines that the rich period process has not just been switched to the lean period process (S22: NO), the process proceeds to step S25. In step S25, the adsorption amount acquisition unit 141 calculates the oxygen adsorption amount OSA. Specifically, the adsorption amount acquisition unit 141 calculates a unit increase amount $\Delta OSA$, which is an increase amount of the oxygen adsorption amount per unit time, and calculates an integrated value of the unit increase amount $\Delta OSA$ as the oxygen adsorption amount OSA. The unit increase amount $\Delta OSA$ increases as the difference of the air-fuel ratio detection value AF and the stoichiometric air-fuel ratio AFS, or the above-described changed value Z, increases. Further, the unit increase amount $\Delta OSA$ increases as the intake air amount GA increases. For example, the adsorption amount acquisition unit 141 calculates the unit increase amount $\Delta OSA$ from the following equation (Equation 2). In the equation (Equation 2), "ROX" refers to a ratio of oxygen in the intake air.

Equation 2

$$\Delta OSA = (AF - AFS)/AFS * GA * ROX \qquad \text{(Equation 2)}$$

When the oxygen adsorption amount OSA is calculated in step S25, the adsorption amount acquisition unit 141 then temporarily ends the present processing routine.

Figure 5:
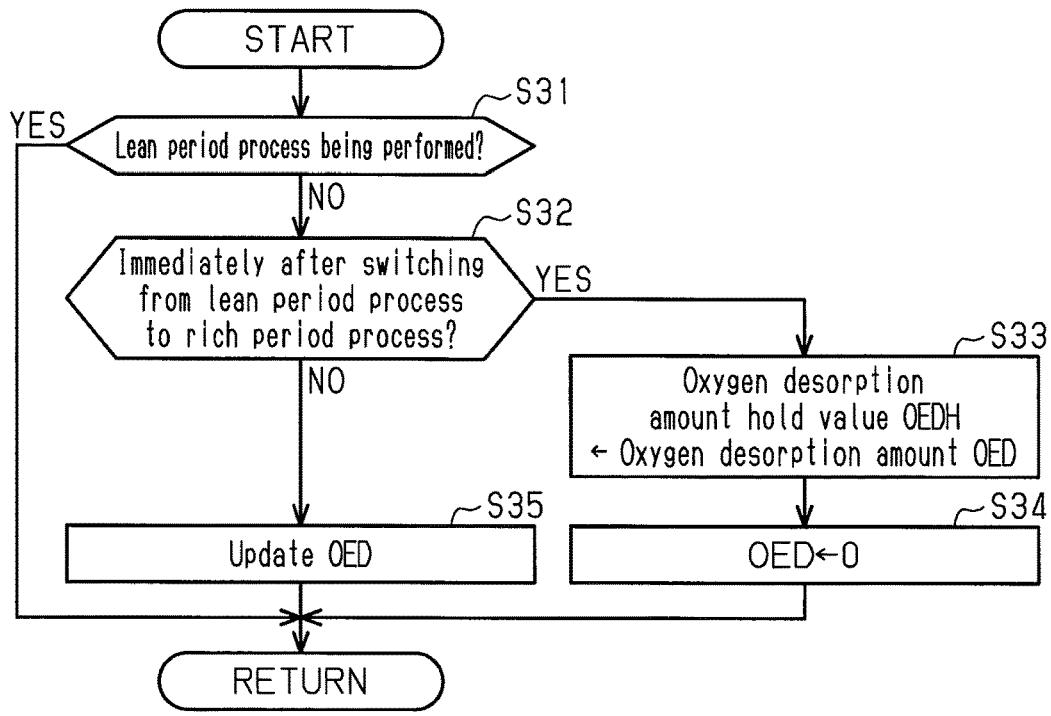
FIG. 5 is a flowchart illustrating a processing routine performed by a desorption amount acquisition unit of the controller.

A processing routine performed by the desorption amount acquisition unit 142 when calculating the oxygen desorption amount OED will now be described with reference to FIG. 5. This processing routine is repeatedly executed during execution of the learning control.

In step S31 of the present processing routine, the desorption amount acquisition unit 142 determines whether the target air-fuel ratio adjustment unit 120 is performing the lean period process. When the desorption amount acquisition unit 142 determines that the lean period process is being performed (S31: YES), oxygen is not desorbed from the catalyst 22. Thus, the desorption amount acquisition unit 142 temporarily ends the present processing routine. When the desorption amount acquisition unit 142 determines that the lean period process is not being performed (S31: NO), the desorption amount acquisition unit 142 proceeds to step S32. In step S32, the desorption amount acquisition unit 142 determines whether the process performed by the target air-fuel ratio adjustment unit 120 is a process performed immediately after switching from the lean period process to the rich period process. When the lean period process was performed in the preceding processing routine and the rich period process is being performed in the present processing routine, the lean period process has just been switched to the rich period process. When the rich period process was performed in the preceding processing routine and the rich period process is also being performed in the present processing routine, the lean period process has not just been switched to the rich period process.

When the desorption amount acquisition unit 142 determines that the lean period process has just been switched to the rich period process (S32: YES), the desorption amount acquisition unit 142 proceeds to step S33. In step S33, the oxygen desorption amount OED is substituted into an oxygen desorption amount hold value OEDH. Specifically, the oxygen desorption amount hold value OEDH becomes the same value as the oxygen desorption amount OED acquired during the preceding rich period process. Subsequently, in step S34, the desorption amount acquisition unit 142 resets the oxygen desorption amount OED to "0". Then, the desorption amount acquisition unit 142 temporarily ends the present processing routine. When the desorption amount acquisition unit 142 determines that the lean period process has not just been switched to the rich period process (S32: NO), the process proceeds to step S35. In step S35, the desorption amount acquisition unit 142 calculates the oxygen desorption amount OED. Specifically, the desorption amount acquisition unit 142 calculates a unit desorption amount ΔOED, which is the amount of oxygen desorbed from the catalyst 22 per unit time. The desorption amount acquisition unit 142 also calculates an integrated value of the unit desorption amount ΔOED as the oxygen desorption amount OED. The unit desorption amount ΔOED increases as the difference of the air-fuel ratio detection value AF and the stoichiometric air-fuel ratio AFS, or the above-described changed value Z, increases. Further, the unit desorption amount ΔOED increases as the fuel injection amount increases. When the target air-fuel ratio AFTr is constant, the fuel injection amount is correlated with the intake air amount GA. Thus, when the target air-fuel ratio AFTr is a richer value than the stoichiometric air-fuel ratio AFS, the unit desorption amount ΔOED increases as the intake air amount GA increases. For example, the desorption amount acquisition unit 142 calculates the unit desorption amount ΔOED from the following equation (Equation 3).

Equation 3

$$\Delta OED = (AF - AFS / AFS) * GA * ROX \qquad \text{(Equation 3)}$$

When the oxygen desorption amount OED is calculated in step S35, the desorption amount acquisition unit 142 temporarily ends the present processing routine.

A process performed by the oxygen amount deviation calculator 143 to calculate the oxygen amount deviation DOA will now be described.

In a case where the process performed by the target air-fuel ratio adjustment unit 120 is switched from the lean period process to the rich period process, the oxygen amount deviation DOA is calculated when the oxygen desorption amount hold value OEDH is updated in step S33 and the oxygen desorption amount OED is reset to "0" in step S34. In this case, the oxygen amount deviation DOA is calculated by subtracting the oxygen adsorption amount OSA from the oxygen desorption amount hold value OEDH.

In a case where the process performed by the target air-fuel ratio adjustment unit 120 is switched from the rich period process to the lean period process, the oxygen amount deviation DOA is calculated when the oxygen adsorption amount hold value OSAH is updated in step S23 and the oxygen adsorption amount OSA is reset to "0" in step S24. In this case, the oxygen amount deviation DOA is calculated by subtracting the oxygen adsorption amount hold value OSAH from the oxygen desorption amount OED.

Figure 6:
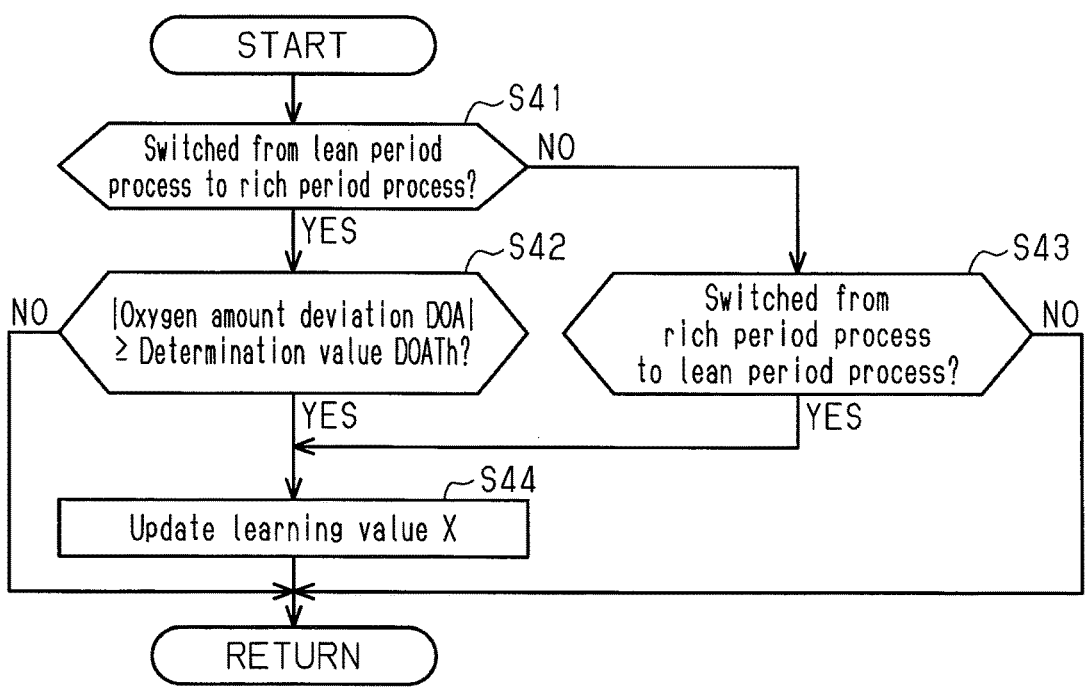
FIG. 6 is a flowchart illustrating a processing routine performed by a learning value calculator of the controller.

A processing routine performed by the learning value calculator 144 to update the learning value X will now be described with reference to FIG. 6. This processing routine is repeatedly performed during execution of the learning control.

In step S41 of the present processing routine, the learning value calculator 144 determines whether the process performed by the target air-fuel ratio adjustment unit 120 has been switched from the lean period process to the rich period process. When the lean period process was performed during the preceding processing routine and the rich period process is being performed during the present processing routine, the lean period process has been switched to the rich period process. When the learning value calculator 144 determines that the lean period process has been switched to the rich period process (S41: YES), the process proceeds to step S42. In step S42, the learning value calculator 144 determines whether an absolute value of the oxygen amount deviation DOA calculated by the oxygen amount deviation calculator 143 when the lean period process is switched to the rich period process is greater than or equal to a determination value DOATh. When the absolute value of the oxygen amount deviation DOA is large, the steady deviation between the air-fuel ratio detection value AF detected by the upstream side air-fuel ratio sensor 31 and the actual air-fuel ratio AFR has not been sufficiently compensated for, and the learning value X needs to be extensively updated. That is, the determination value DOATh is a reference for determining whether to extensively update the learning value X.

In step S42, when the absolute value of the oxygen amount deviation DOA is greater than or equal to the determination value DOATh (YES), the learning value calculator 144 proceeds to step S44, which will be described later. In this case, the learning value calculator 144 updates the learning value X. When the absolute value of the oxygen amount deviation DOA is less than the determination value DOATh (S42: NO), the learning value calculator 144 temporarily ends the present processing routine. In this case, the learning value X is not updated. That is, when the lean period process is switched to the rich period process, the learning value X is updated as long as the absolute value of the oxygen amount deviation DOA is greater than or equal to the determination value DOATh.

When the learning value calculator 144 determines that the lean period process is not switched to the rich period process (NO) in step S41, the learning value calculator 144 proceeds to step S43. In step S43, the learning value calculator 144 determines whether the process performed by the target air-fuel ratio adjustment unit 120 has been switched from the rich period process to the lean period process. When the rich period process was performed during the preceding processing routine and the lean period process is being performed during the present processing routine, the rich period process has been switched to the lean period process. When the learning value calculator 144 determines that the rich period process has been switched to the lean period process (S43: YES), the learning value calculator 144 proceeds to step S44. That is, the learning value X is updated regardless of the oxygen amount deviation DOA calculated when the rich period process is switched to the lean period process. When the learning value calculator 144 determines that the rich period process is not is switched to the lean period process (S43: NO), the learning value calculator 144 temporarily ends the present processing routine.

In step S44, the learning value calculator 144 updates the learning value X is based on the oxygen amount deviation DOA. In the present embodiment, a learning update value DX is acquired based on the oxygen amount deviation DOA, and the sum of the learning value X and the learning update value DX is calculated as a new learning value X. The learning update value DX is acquired using the map shown in FIG. 7.

Figure 7:
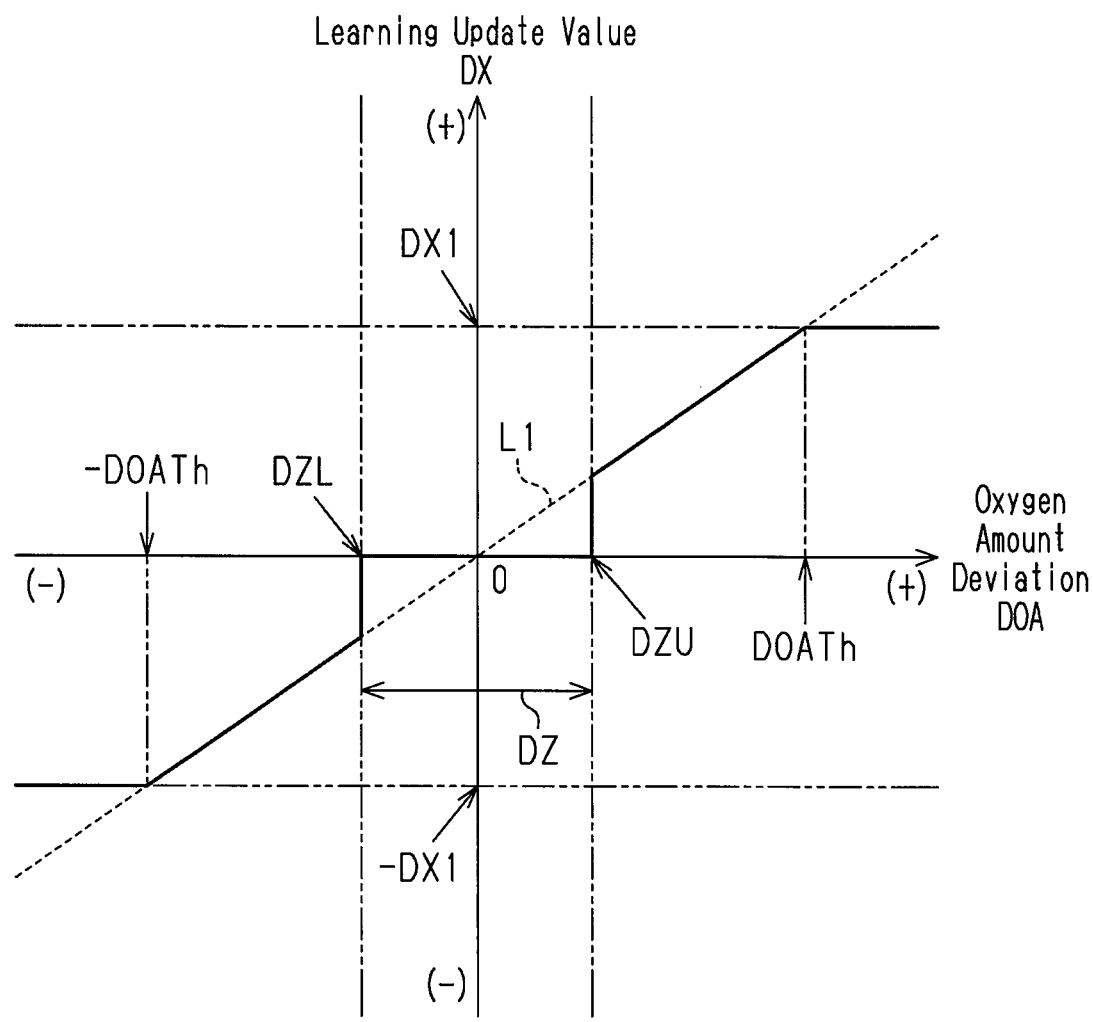
FIG. 7 is a map illustrating the relationship of a learning update value and an oxygen amount deviation.

The solid lines shown in FIG. 7 indicate the map used for acquiring the learning update value DX based on the oxygen amount deviation DOA. The broken lines L1 shown in FIG. 7 indicate the product of the oxygen amount deviation DOA and a coefficient α. The coefficient α is a coefficient used for converting the oxygen amount deviation DOA into the learning update value DX.

As shown in FIG. 7, when the oxygen amount deviation DOA is in a learning dead zone DZ, the learning update value DX is "0". The learning dead zone DZ corresponds to a range of the oxygen amount deviation DOA in which the absolute value of the oxygen amount deviation DOA is small so that it can be determined that the learning value X does not have to be updated. The learning dead zone DZ has an upper limit DZU that is greater than "0" and a lower limit DZL that is smaller than "0".

When the oxygen amount deviation DOA is greater than the upper limit DZU of the learning dead zone DZ, the learning update value DX becomes equal to the smaller one of a specified value DX1 and the product of the oxygen amount deviation DOA and the coefficient α. When the oxygen amount deviation DOA is smaller than the lower limit DZL of the learning dead zone DZ, the learning update value DX is equal to the larger one of the product of the oxygen amount deviation DOA and the coefficient α and the product of the specified value DX1 and "−1".

In the present embodiment, the specified value DX1 is set so that the specified value DX1 is the same as the absolute value of the product of the oxygen amount deviation DOA, which is obtained when the absolute value of the oxygen amount deviation DOA is equal to the determination value DOATh, and the coefficient α. Thus, in the present embodiment, when the absolute value of the oxygen amount deviation DOA is greater than or equal to the determination value DOATh, the absolute value of the learning update value DX, which is a single update amount of the learning value X, corresponds to the specified value DX1. When the absolute value of the oxygen amount deviation DOA is less than the determination value DOATh, the absolute value of the learning update value DX, which is a single update amount of the learning value X, is decreased as the absolute value of the oxygen amount deviation DOA decreases.

Returning to FIG. 6, when the learning value calculator 144 completes the updating of the learning value X in step S44, the learning value calculator 144 temporarily ends the present processing routine.

The updating of the learning value X ends when the oxygen amount deviation DOA is converged in the learning dead zone DZ. Specifically, the updating of the learning value X ends when a state in which the oxygen amount deviation DOA is included in the learning dead zone DZ continues for an end determination time or longer. When the updating of the learning value X ends in this manner, the execution of the learning control ends. Even when the learning control ends, the compensation control is continued.

Figure 8:
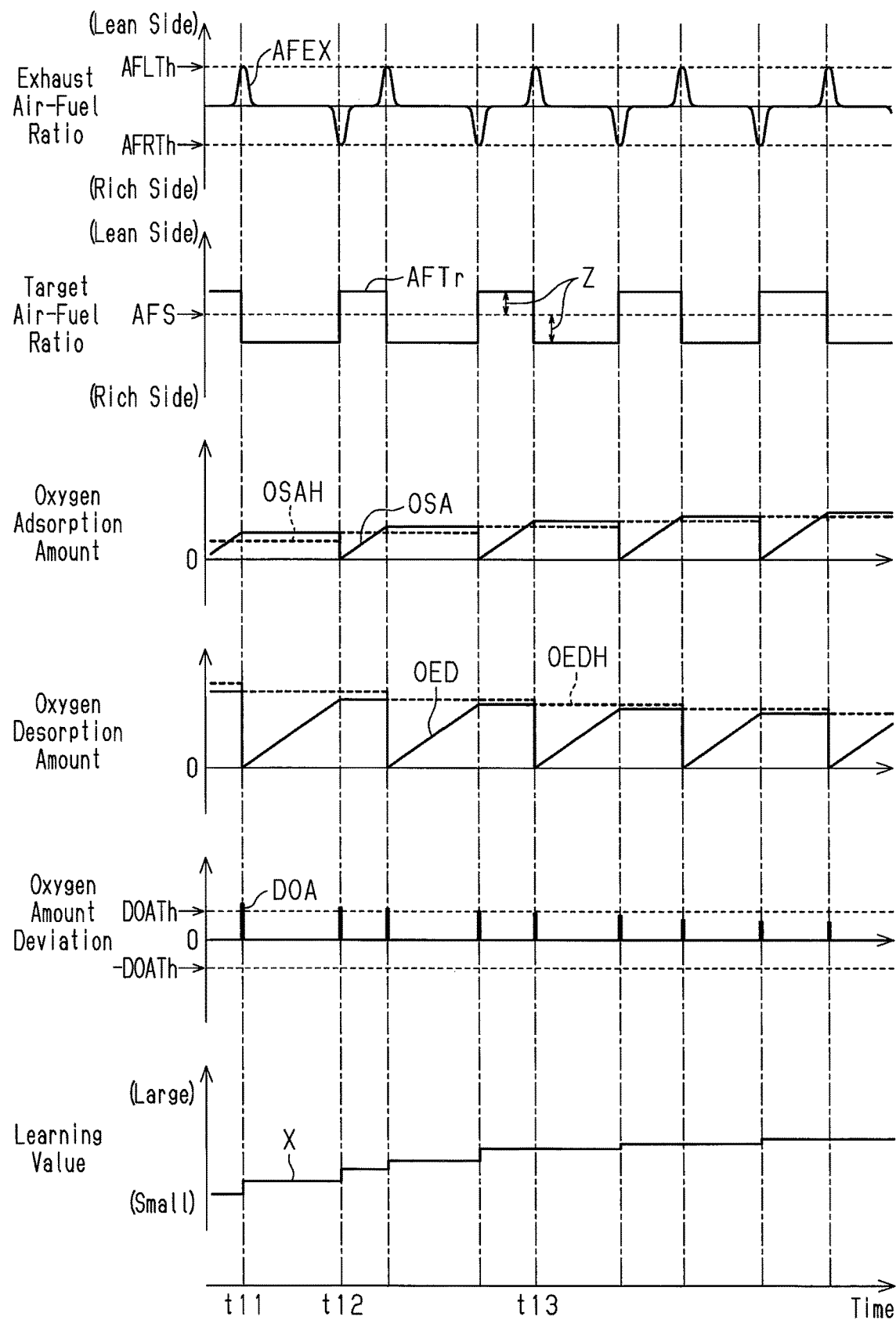
FIG. 8 is a timing chart for performing a process to compensate for a steady deviation between an air-fuel ratio and an actual air-fuel ratio.

The operation and advantages of the present embodiment will now be described with reference to FIG. 8. FIG. 8 illustrates an example in which the air-fuel ratio detection value AF is deviated toward the rich side from the actual air-fuel ratio AFR.

When the lean period process is being performed, the target air-fuel ratio AFTr is a leaner value than the stoichiometric air-fuel ratio AFS, and the catalyst 22 adsorbs oxygen from the exhaust. Thus, the oxygen adsorption amount OSA is acquired. In contrast, the oxygen desorption amount OED is maintained at the value obtained during the preceding rich period process.

If the actual oxygen adsorption amount of the catalyst 22 has not reached its upper limit, the exhaust air-fuel ratio AFEX detected by the downstream side air-fuel ratio sensor 32 is equal to the stoichiometric air-fuel ratio. However, when the actual oxygen adsorption amount of the catalyst 22 has reached its upper limit, the catalyst 22 is unable to adsorb oxygen from the exhaust, which is discharged from the combustion chamber 13 into the exhaust passage 20. This increases the amount of oxygen passing through the catalyst 22. As a result, the exhaust air-fuel ratio AFEX becomes a leaner value than the stoichiometric air-fuel ratio.

At timing t11, when the exhaust air-fuel ratio AFEX becomes a leaner value than the lean determination value AFLTh, the lean period process ends and the rich period process is started. Further, at timing t11, the oxygen amount deviation DOA is calculated by subtracting the oxygen adsorption amount OSA acquired during the lean period process, which is performed until timing t11, from the oxygen desorption amount OED, which is the oxygen desorption amount hold value OEDH acquired during the preceding rich period process. In this case, the absolute value of the oxygen amount deviation DOA is greater than the determination value DOATh. Thus, the learning value X is updated even during transition from the lean period process to the rich period process.

In the present embodiment, the learning value X is a value for correcting the stoichiometric air-fuel ratio AFS. Thus, when the learning value X is updated, the stoichiometric air-fuel ratio AFS is also updated. Accordingly, after the stoichiometric air-fuel ratio AFS is updated, the air-fuel ratio control is executed using the target air-fuel ratio AFTr based on the updated stoichiometric air-fuel ratio AFS.

In a period from timing t11 to timing t12, the rich period process is performed. During the rich period process, the target air-fuel ratio AFTr is a richer value than the stoichiometric air-fuel ratio AFS. Thus, oxidation (burning) of unburned fuel included in the exhaust discharged from the combustion chamber 13 to the exhaust passage 20 decreases the amount of oxygen absorbed in the catalyst 22. Accordingly, the oxygen desorption amount OED is acquired during the rich period process. In contrast, the oxygen adsorption amount OSA is maintained at the value obtained at timing t11.

When oxygen is absorbed in the catalyst 22, the absorbed oxygen oxidizes unburned fuel. Thus, the exhaust air-fuel ratio AFEX detected by the downstream side air-fuel ratio sensor 32 becomes equal to the stoichiometric air-fuel ratio. However, when the adsorbed oxygen is all consumed and the catalyst 22 has no adsorbed oxygen, the exhaust purification device 21 cannot oxidize unburned fuel included in the exhaust discharged into the exhaust passage 20 from the combustion chamber 13. As a result, unburned fuel flows through the downstream side of the catalyst 22 in the exhaust passage 20. Accordingly, the exhaust air-fuel ratio AFEX becomes a richer value than the stoichiometric air-fuel ratio.

At timing t12, when the exhaust air-fuel ratio AFEX becomes a richer value than the rich determination value AFRTh, the rich period process ends and the lean period process is started. Further, at timing t12, the oxygen amount deviation DOA is calculated by subtracting the oxygen adsorption amount hold value OSAH, which is the oxygen adsorption amount OSA acquired during the preceding lean period process, from the oxygen desorption amount OED acquired during the rich period process, which is performed until timing t12. In this case, the oxygen amount deviation DOA is a value outside the learning dead zone DZ shown in FIG. 7. Thus, the learning value X is updated during transition from the rich period process to the lean period process. When the learning value X is updated in this manner, the stoichiometric air-fuel ratio AFS is also updated. Then, the air-fuel ratio control is executed using the target air-fuel ratio AFTr based on the corrected stoichiometric air-fuel ratio AFS. This corrects the deviation between the oxygen desorption amount OED and the oxygen adsorption amount OSA.

In the present embodiment, in a case where the absolute value of the oxygen amount deviation DOA is greater than or equal to the determination value DOATh, the learning value X is updated in both cases where the rich period process is switched to the lean period process and where the lean period process is switched to the rich period process. As a result, even when the absolute value of the oxygen amount deviation DOA is greater than or equal to the determination value DOATh, the learning value X can be updated more frequently than when the learning value X is only updated when the rich period process is switched to the lean period process or when the lean period process is switched to the rich period process. Such an increase in the updating frequency of the learning value X shortens the time required to complete update of the learning value X.

In a case where the stoichiometric air-fuel ratio AFS obtained when acquiring the oxygen adsorption amount OSA, which is used to calculate the oxygen amount deviation DOA, is referred to as a first stoichiometric air-fuel ratio, and the stoichiometric air-fuel ratio AFS obtained when acquiring the oxygen desorption amount OED, which is used to calculate the oxygen amount deviation DOA, is referred to as a second stoichiometric air-fuel ratio, the second stoichiometric air-fuel ratio will be a value that differs from the first stoichiometric air-fuel ratio if the learning value X is updated whenever the process performed by the target air-fuel ratio adjustment unit 120 is switched. Even when the oxygen amount deviation DOA is calculated using the oxygen adsorption amount OSA and the oxygen desorption amount OED, which are acquired using different stoichiometric air-fuel ratios AFS, the calculation will not have a high degree of accuracy. However, when the absolute value of the oxygen amount deviation DOA is greater than or equal to the determination value DOATh, the learning update value DX is set so that the absolute value becomes equal to the specified value DX1. Thus, the low degree of accuracy of the calculation of the oxygen amount deviation DOA will subtly affect the updating accuracy of the learning value X.

When the stoichiometric air-fuel ratio AFS corrected by updating the learning value X and the air-fuel ratio control is executed using the target air-fuel ratio AFTr based on the corrected stoichiometric air-fuel ratio AFS, the absolute value of the oxygen amount deviation DOA will be decreased. Further, even when the lean period process is switched to the rich period process, the absolute value of the oxygen amount deviation DOA may not be greater than or equal to the determination value DOATh, for example, like at timing t13. When the absolute value of the oxygen amount deviation DOA is less than the determination value DOATh, it can be determined that the update of the learning value X has somewhat progressed. Thus, the learning value X will not be updated even when the lean period process is switched to the rich period process. That is, the learning value X is updated only when the rich period process is switched to the lean period process.

Accordingly, when the absolute value of the oxygen amount deviation DOA is less than the determination value DOATh, the stoichiometric air-fuel ratio AFS, which is obtained when acquiring the oxygen adsorption amount OSA used to calculate the oxygen amount deviation DOA, becomes equal to the stoichiometric air-fuel ratio AFS, which is obtained when acquiring the oxygen desorption amount OED used to calculate the oxygen amount deviation DOA. Thus, the degree of calculation accuracy of the oxygen amount deviation DOA will not decreased. Further, the learning update value DX is acquired using such oxygen amount deviation DOA. This prevents the absolute value of the learning update value DX from becoming overly large. That is, hunting of the learning value X will be reduced. When the oxygen amount deviation DOA is included in the learning dead zone DZ, updating of the learning value X ends.

The learning control may be executed when the air-fuel ratio detection value AF is deviated toward the lean side from the actual air-fuel ratio AFR. In a case where the absolute value of the oxygen amount deviation DOA is greater than or equal to the determination value DOATh, the learning value X is updated in both cases where the rich period process is switched to the lean period process and where the lean period process is switched to the rich period process. When the learning value X is updated in this manner, the absolute value of the oxygen amount deviation DOA is gradually decreased. Further, in a case where the absolute value of the oxygen amount deviation DOA is no longer greater than or equal to the determination value DOATh, the learning value X is updated when the rich period process is switched to the lean period process, and the learning value X is not updated when the lean period process is switched to the rich period process. Therefore, even when the air-fuel ratio detection value AF is deviated toward the lean side from the actual air-fuel ratio AFR, the same advantage is obtained as when the air-fuel ratio detection value AF is deviated toward the rich side from the actual air-fuel ratio AFR.

The present embodiment further obtains the following advantages.

(1) In the present embodiment, when updating the learning value X, the absolute value of the learning update value DX increases as the absolute value of the oxygen amount deviation DOA increases. However, when the absolute value of the product of the oxygen amount deviation DOA and the coefficient α is greater than the specified value DX1, the absolute value of the learning update value DX becomes equal to the specified value DX1. This prevents a single update amount of the learning value X from becoming overly large.

Further, when the absolute value of the oxygen amount deviation DOA is greater than or equal to the determination value DOATh, the degree of calculation accuracy of the oxygen amount deviation DOA is not high. Thus, when the product of the oxygen amount deviation DOA and the coefficient α is the learning update value DX, the absolute value of the learning update value DX may become overly large and cause hunting when updating the learning value X. Moreover, when the absolute value of the oxygen amount deviation DOA is greater than or equal to the determination value DOATh, it can be determined that the steady deviation amount between the air-fuel ratio detection value AF and the actual air-fuel ratio is large. Thus, it is desirable that a single updating amount of the learning value be increased to shorten the time required to complete updating of the learning value. In this respect, in the present embodiment, when the absolute value of the oxygen amount deviation DOA is greater than or equal to the determination value DOATh, the learning update value DX corresponds to the specified value DX1. As a result, a single updating amount of the learning value X will not be overly large and the time required to complete updating of the learning value is shortened.

Therefore, in the present embodiment, hunting is reduced when updating the learning value X.

(2) When the absolute value of the oxygen amount deviation DOA is less than the determination value DOATh, it can be determined that the steady deviation amount between the air-fuel ratio detection value AF and the actual air-fuel ratio is not relatively large. Thus, the absolute value of the learning update value DX can be decreased as the absolute value of the oxygen amount deviation DOA decreases. That is, a single updating amount of the learning value X can be decreased. As a result, hunting is reduced when updating the learning value X.

The above embodiment may be modified as follows. The above embodiment and the following modifications can be combined as long as the combined modifications remain technically consistent with each other.

Figure 9:
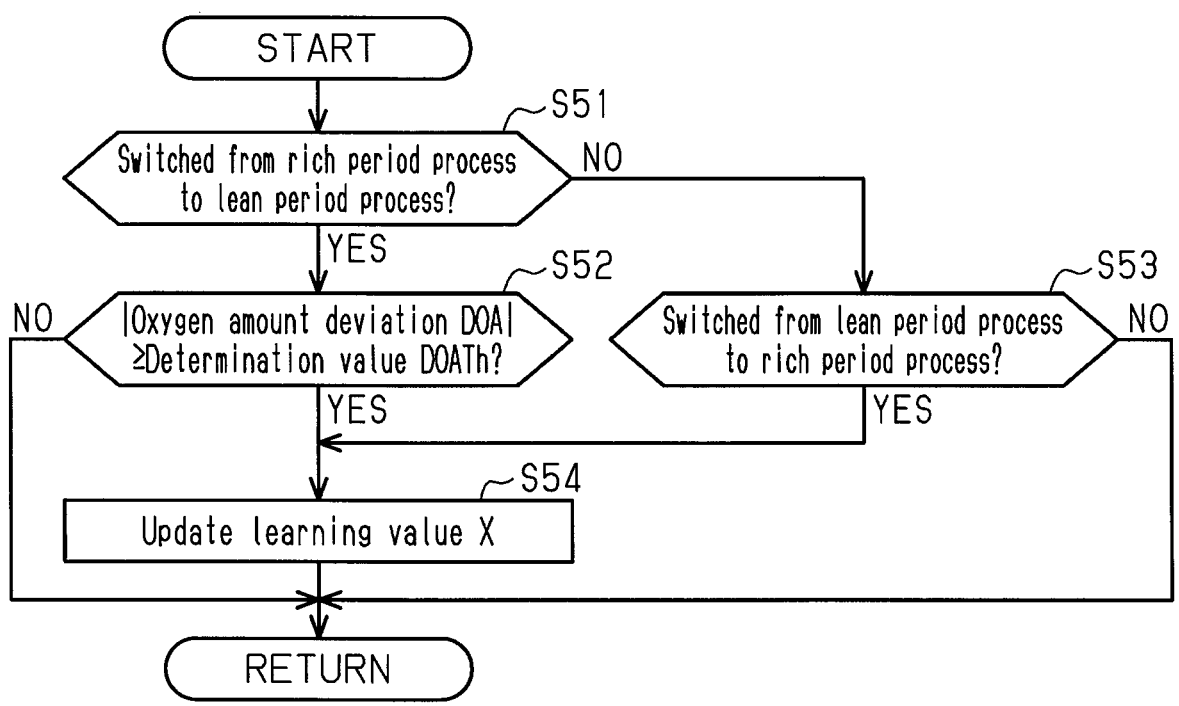
FIG. 9 is a flowchart illustrating a modified example of the processing routine performed when acquiring a learning value.

In a case where the absolute value of the oxygen amount deviation DOA is less than the determination value DOATh, the learning value X may be updated when the lean period process is switched to the rich period process, and the learning value X does not have to be updated when the rich period process is switched to the lean period process. FIG. 9 illustrates a processing routine performed by the learning value calculator 144 in this case.

In step S51 of the present processing routine, the learning value calculator 144 determines whether the process performed by the target air-fuel ratio adjustment unit 120 has been switched from the rich period process to the lean period process. When determining that the rich period process has been switched to the lean period process (S51: YES), the learning value calculator 144 proceeds to step S52. In step S52, the learning value calculator 144 determines whether the absolute value of the oxygen amount deviation DOA calculated when the rich period process is switched to the lean period process is greater than or equal to the determination value DOATh. When the absolute value of the oxygen amount deviation DOA is greater than or equal to the determination value DOATh (S52: YES), the process proceeds to step S54, which will be described later. In this case, the learning value X is updated. When the absolute value of the oxygen amount deviation DOA is less than the determination value DOATh (S52: NO), the learning value calculator 144 temporarily ends the present processing routine. That is, when the rich period process is switched to the lean period process, the learning value calculator 144 updates the learning value X as long as the absolute value of the oxygen amount deviation DOA is greater than or equal to the determination value DOATh.

In step S51, when the learning value calculator 144 determines that the rich period process has not been switched to the lean period process (NO), the learning value calculator 144 proceeds to step S53. In step S53, the learning value calculator 144 determines whether the process performed by the target air-fuel ratio adjustment unit 120 has been switched from the lean period process to the rich period process. When the learning value calculator 144 determines that the lean period process has been switched to the rich period process (S53: YES), the process proceeds to step S54. That is, the learning value X is updated regardless of the oxygen amount deviation DOA calculated when the lean period process is switched to the rich period process. When the learning value calculator 144 determines that the lean period process is not switched to the rich period process (S53: NO), the learning value calculator 144 temporarily ends the present processing routine.

In step S54, the learning value calculator 144 updates the learning value X in the same manner as in step S44. This temporarily ends the present processing routine.

The lean period process may be switched to the rich period process under a condition that differs from the condition described in the above embodiment. For example, the target air-fuel ratio adjustment unit 120 may end the rich period process and start the lean period process under a condition in which the oxygen adsorption amount OSA acquired by the adsorption amount acquisition unit 141 has reached a specified adsorption amount OSATh. Further, the target air-fuel ratio adjustment unit 120 may end the lean period process and start the rich period process under a condition in which the lean period process has continued for a specified lean period process continuation time.

The condition for switching the rich period process to the lean period process may differ from the condition described in the above embodiment. For example, the target air-fuel ratio adjustment unit 120 may end the rich period process and start the lean period process under a condition in which the oxygen desorption amount OED acquired by the desorption amount acquisition unit 142 has reached a specified desorption amount OEDTh. Further, the target air-fuel ratio adjustment unit 120 may end the rich period process and start the lean period process under a condition in which the rich period process has continued for a specified rich period process continuation time.

The deviation amount between the target air-fuel ratio AFTr and the stoichiometric air-fuel ratio AFS during the lean period process may differ from the deviation amount between the target air-fuel ratio AFTr and the stoichiometric air-fuel ratio AFS during the rich period process.

The downstream side air-fuel ratio sensor 32 may be a sensor having characteristics with which the voltage of a signal suddenly changes in the vicinity of the stoichiometric air-fuel ratio.

In the above embodiment, the stoichiometric air-fuel ratio AFS is corrected using the learning value X based on the oxygen amount deviation DOA. This compensates for the steady deviation between the air-fuel ratio detection value AF and the actual air-fuel ratio AFR. However, the steady deviation may be compensated for by correcting a parameter other than the stoichiometric air-fuel ratio AFS. For example, the above-described steady deviation may be compensated for by correcting the required injection amount QBR instead of the stoichiometric air-fuel ratio AFS. In this case, the oxygen amount deviation DOA is converted into a learning value corresponding to the fuel injection amount. When the required injection amount QBR is corrected using the learning value, the same advantages as the above embodiment can be obtained.

The learning update value DX may be acquired without using the specified value DX1. Specifically, in a case where the oxygen amount deviation DOA is greater than the upper limit DZU of the learning dead zone DZ, the learning update value DX may be equal to the product of the oxygen amount deviation DOA and the coefficient α even when the oxygen amount deviation DOA is greater than or equal to the determination value DOATh. In the same way, in a case where the oxygen amount deviation DOA is less than the lower limit DZL of the learning dead zone DZ, the learning update value DX may be set equal to the product of the oxygen amount deviation DOA and the coefficient α even when the absolute value of the oxygen amount deviation DOA is greater than or equal to the determination value DOATh.

When the learning update value DX is acquired without using the specified value DX1, the size of the coefficient α may be changed depending on whether the absolute value of the oxygen amount deviation DOA is greater than or equal to the determination value DOATh. For example, when the coefficient α that is obtained when the absolute value of the oxygen amount deviation DOA is less than the determination value DOATh is referred to as a first coefficient α1, the coefficient α that is obtained when the absolute value of the oxygen amount deviation DOA is greater than or equal the determination value DOATh may be referred to as a second coefficient α2 that is smaller than the first coefficient α1.

The specified value DX1 may be set so that the absolute value of the product of the oxygen amount deviation DOA and the coefficient α, which is obtained when the absolute value of the oxygen amount deviation DOA is equal to the determination value DOATh, is smaller than the specified value DX1. In this case, the absolute value of the learning update value DX may be equal to the specified value DX1 even when the absolute value of the oxygen amount deviation DOA is smaller than the determination value DOATh.

The internal combustion engine 10 may include a port injection valve that injects fuel into the intake passage 14 as a fuel injection valve. Further, the internal combustion engine 10 may include both of a direct injection valve that injects the fuel directly into the cylinders 11 and a port injection valve as the fuel injection valves.

The controller 30 does not have to perform software processing on all processes it executes. For example, the controller 30 may include a dedicated hardware circuit (such as application-specific integrated circuit (ASIC)) that performs hardware processing on at least part of the processes executed by software in the present embodiment. That is, the controller 30 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, wherein the internal combustion engine includes
    an exhaust passage into which an exhaust produced in the internal combustion engine is discharged, and
    an exhaust purification device including a catalyst arranged in the exhaust passage and having an oxygen adsorption function, the exhaust purification device using oxygen adsorbed in the catalyst to purify the exhaust flowing through the exhaust passage,
    the controller comprising:
        a fuel amount control unit configured to adjust an amount of fuel supplied to a cylinder of the internal combustion engine through feedback control that uses an air-fuel ratio deviation, which is a deviation between an air-fuel ratio detection value that is an air-fuel ratio detected by an upstream side air-fuel ratio sensor located at an upstream side of the catalyst in the exhaust passage and a target air-fuel ratio, as an input;
        a target air-fuel ratio adjustment unit configured to alternately repeat a lean period process in which the target air-fuel ratio is set to a leaner value than a stoichiometric air-fuel ratio and a rich period process in which the target air-fuel ratio is set to a richer value than the stoichiometric air-fuel ratio; and
        a learning value update unit configured to update a learning value that compensates for a steady deviation in the air-fuel ratio detection value,
    the controller is configured to use the learning value to correct a deviation between an oxygen adsorption amount, which is an amount of oxygen adsorbed in the catalyst during the lean period process, and an oxygen desorption amount, which is an amount of oxygen desorbed from the catalyst during the rich period process, in a case where an absolute value of an oxygen amount deviation between the oxygen adsorption amount and the oxygen desorption amount is less than a determination value, the learning value update unit is configured to update the learning value when one of the lean period process and the rich period process is switched to the other one of the lean period process and the rich period process, and the learning value update unit is configured not to update the learning value when the other one of the lean period process and the rich period process is switched to the one of the lean period process and the rich period process, and in a case where the absolute value of the oxygen amount deviation is greater than or equal to the determination value, the learning value update unit is configured to update the learning value in both of a case where one of the lean period process and the rich period process is switched to the other one of the lean period process and the rich period process and a case where the other one of the lean period process and the rich period process is switched to the one of the lean period process and the rich period process.

2. The controller according to claim 1, wherein the learning value update unit is configured to set a single update amount of the learning value to a smaller one of a specified value and an absolute value of a product of the oxygen amount deviation and a coefficient.

3. The controller according to claim 2, wherein when the absolute value of the oxygen amount deviation is greater than or equal to the determination value, the learning value update unit is configured to set the single update amount of the learning value to the specified value.

4. The controller for the internal combustion engine according to claim 3, wherein when the absolute value of the oxygen amount deviation is less than the determination value, the learning value update unit is configured to decrease the single update amount of the learning value as the absolute value of the oxygen amount deviation decreases.

5. The controller according to claim 1, wherein
a downstream side air-fuel ratio sensor is located at a downstream side of the catalyst in the exhaust passage, and
the target air-fuel ratio adjustment unit is configured to switch the lean period process to the rich period process when an exhaust air-fuel ratio detected by the downstream side air-fuel ratio sensor during the lean period process is a leaner value than the stoichiometric air-fuel ratio, and the target air-fuel ratio adjustment unit is configured to switch the rich period process to the lean period process when the exhaust air-fuel ratio is a richer value than the stoichiometric air-fuel ratio during the rich period process.

6. The controller according to claim 1, wherein the learning value update unit is configured to update the learning value as a value for correcting the stoichiometric air-fuel ratio.

7. A controller for an internal combustion engine, wherein the internal combustion engine includes
an exhaust passage into which an exhaust produced in the internal combustion engine is discharged, and
an exhaust purification device including a catalyst arranged in the exhaust passage and having an oxygen adsorption function, the exhaust purification device using oxygen adsorbed in the catalyst to purify the exhaust flowing through the exhaust passage, the controller comprising circuitry configured to
adjust an amount of fuel supplied to a cylinder of the internal combustion engine through feedback control that uses an air-fuel ratio deviation, which is a deviation between an air-fuel ratio detection value that is an air-fuel ratio detected by an upstream side air-fuel ratio sensor located at an upstream side of the catalyst in the exhaust passage and a target air-fuel ratio, as an input,
alternately repeat a lean period process in which the target air-fuel ratio is set to a leaner value than a stoichiometric air-fuel ratio and a rich period process in which the target air-fuel ratio is set to a richer value than the stoichiometric air-fuel ratio,
update a learning value that compensates for a steady deviation in the air-fuel ratio detection value, and
use the learning value to correct a deviation between an oxygen adsorption amount, which is an amount of oxygen adsorbed in the catalyst during the lean period process, and an oxygen desorption amount, which is an amount of oxygen desorbed from the catalyst during the rich period process, in a case where an absolute value of an oxygen amount deviation between the oxygen adsorption amount and the oxygen desorption amount is less than a determination value, the circuitry is configured to update the learning value when one of the lean period process and the rich period process is switched to the other one of the lean period process and the rich period process, and the circuitry is configured not to update the learning value when the other one of the lean period process and the rich period process is switched to the one of the lean period process and the rich period process, and in a case where the absolute value of the oxygen amount deviation is greater than or equal to the determination value, the circuitry is configured to update the learning value in both of a case where one of the lean period process and the rich period process is switched to the other one of the lean period process and the rich period process and a case where the other one of the lean period process and the rich period process is switched to the one of the lean period process and the rich period process.

8. A method for controlling an internal combustion engine, wherein
the internal combustion engine includes
an exhaust passage into which an exhaust produced in the internal combustion engine is discharged, and
an exhaust purification device including a catalyst arranged in the exhaust passage and having an oxygen adsorption function, the exhaust purification device using oxygen adsorbed in the catalyst to purify the exhaust flowing through the exhaust passage, and
the method comprising:
adjusting an amount of fuel supplied to a cylinder of the internal combustion engine through feedback control that uses an air-fuel ratio deviation, which is a deviation between an air-fuel ratio detection value that is an air-fuel ratio detected by an upstream side air-fuel ratio sensor located at an upstream side of the catalyst in the exhaust passage and a target air-fuel ratio, as an input;

alternately repeating a lean period process in which the target air-fuel ratio is a leaner value than a stoichiometric air-fuel ratio and a rich period process in which the target air-fuel ratio is a richer value than the stoichiometric air-fuel ratio;

updating a learning value that compensates for a steady deviation in the air-fuel ratio detection value;

correcting a deviation between an oxygen adsorption amount, which is an amount of oxygen adsorbed in the catalyst during the lean period process, and an oxygen desorption amount, which is an amount of oxygen desorbed from the catalyst during the rich period process, using the learning value;

in a case where an absolute value of an oxygen amount deviation between the oxygen adsorption amount and the oxygen desorption amount is less than a determination value, updating the learning value when one of the lean period process and the rich period process is switched to the other one of the lean period process and the rich period process and not updating the learning value when the other one of the lean period process and the rich period process is switched to the one of the lean period process and the rich period process; and in a case where the absolute value of the oxygen amount deviation is greater than or equal to the determination value, updating the learning value in both of a case where one of the lean period process and the rich period process is switched to the other one of the lean period process and the rich period process and a case where the other one of the lean period process and the rich period process is switched to the one of the lean period process and the rich period.

* * * * *